INVENTOR.
CHARLES R. KING

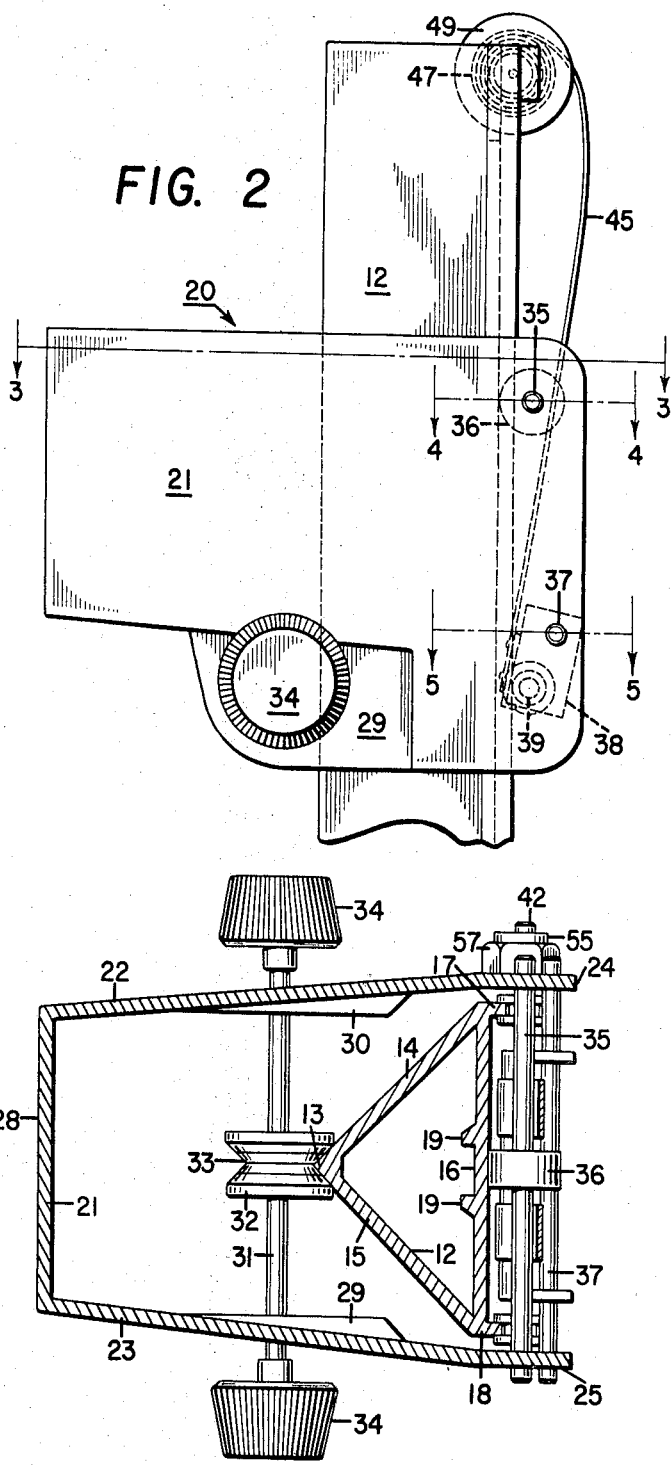

Sept. 29, 1970 C. R. KING 3,531,197
PHOTOGRAPHIC APPARATUS SUPPORT STRUCTURE
Filed Dec. 7, 1967 3 Sheets-Sheet 3
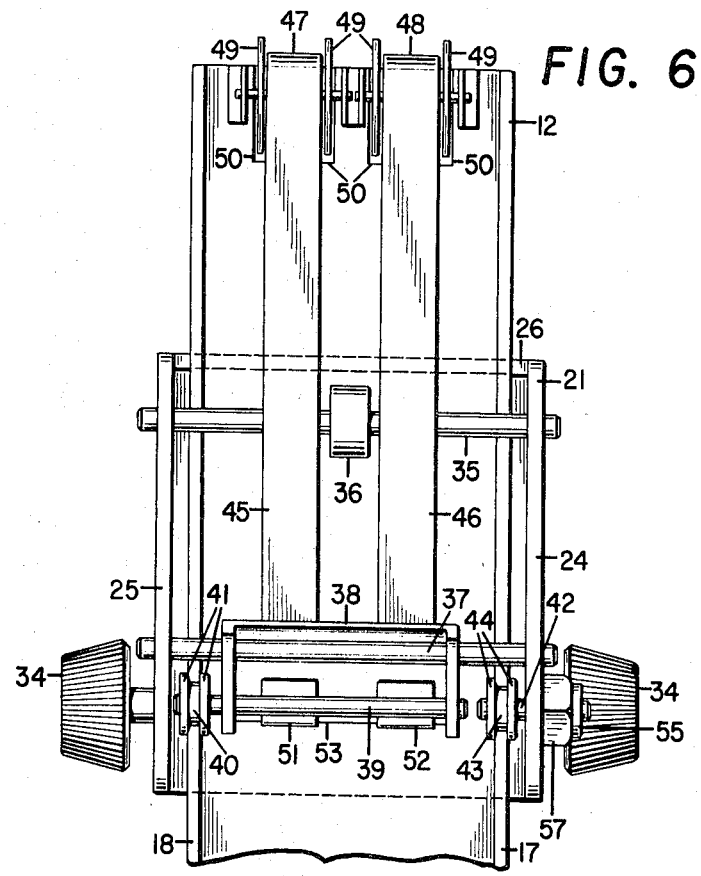
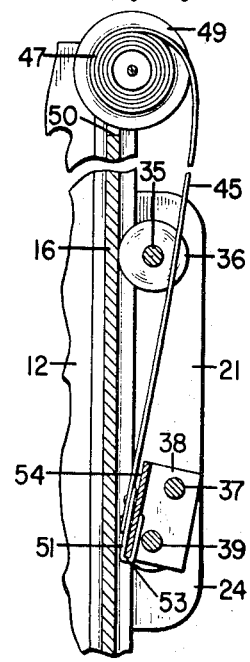
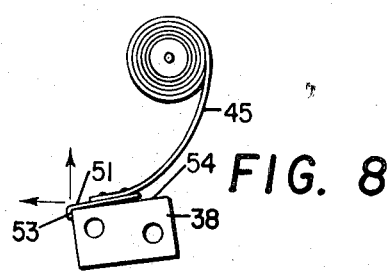
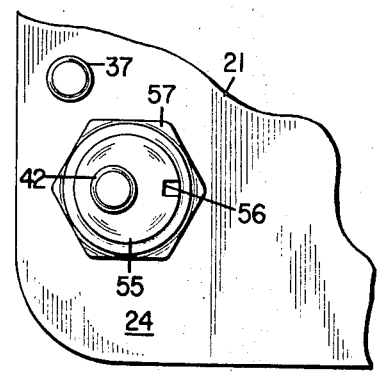
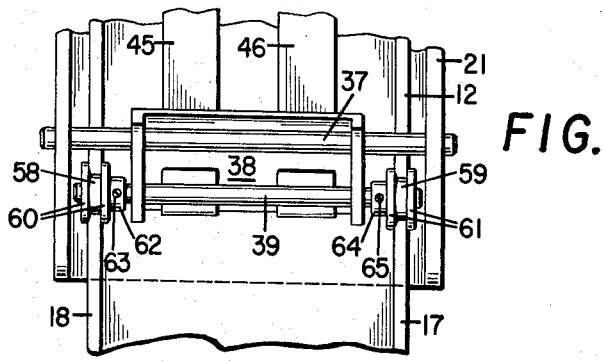
INVENTOR.
CHARLES R. KING
BY Cumpston, Shaw + Stephens
HIS ATTORNEYS.

United States Patent Office 3,531,197
Patented Sept. 29, 1970

3,531,197
PHOTOGRAPHIC APPARATUS SUPPORT STRUCTURE
Charles R. King, East Rochester, N.Y., assignor, by mesne assignments, to Kinex Corporation, Rochester, N.Y., a corporation of New York
Filed Dec. 7, 1967, Ser. No. 688,863
Int. Cl. G03b 27/32
U.S. Cl. 355—18
22 Claims

ABSTRACT OF THE DISCLOSURE

A carriage for supporting a vertically movable camera or enlarger on a triangular column has wheels arranged to bear on the column as follows: a lower front friction wheel with an adjustment knob bears against the apex of the column; an upper rear wheel bears against the back of the column; an adjustable lower rear location wheel engages a rear edge of the column; a pivoted bracket at the lower rear of the column supports a wheel that is biased against the other rear edge of the column; and counterbalance spring strips engage and pivot the bracket to urge the bias wheel into firm engagement with the column. The spring strips are arranged to lift the bracket to pivot it and counterbalance the equipment, and the curl tendency of the spring strips is also used to pivot the bracket for additionally forcing the bias wheel against the rear of the column. The lower front and upper rear wheels support the overhung weight of the equipment, the lower rear location wheel helps set the lateral position of the equipment, and the bias wheel holds all the wheels snugly and firmly in place for smooth and accurate motion of the carriage up and down the column.

---

This invention relates to a photographic apparatus support structure, and more particularly to a wheeled carriage arranged for vertical motion on a column to support a camera, enlarger, or the like.

Many arrangements have been suggested for moving a photographic carriage on a generally vertical column. Generally, the photographic equipment must be counterbalanced and accurately located laterally, and the carriage must provide fast, smooth vertical motion and easy, accurate, vertical adjustment. Prior art support carriages have either been expensive, complex, and cumbersome, or have not adequately met such conditions.

The objects of this invention include, without limitation, a carriage for supporting photographic equipment for vertcal positioning on a column and having the following characteristics:

(a) accurate lateral positioning of the equipment at all times;
(b) smooth, counterbalanced movement rapidly up and down the column;
(c) smooth and accurate vertical adjustment of the carriage;
(d) simplicity, ruggedness, reliability, easy maintenance, and economy; and
(e) attractive appearance, commercial success, and a competitive relationship with other support carriage arrangements.

These and other objects of the invention will be apparent hereinafter from the specification which describes the invention, its use, operation, and preferred embodiments, from the drawings which constitute a part of the disclosure, and from the subject matter claimed.

Generally, the objects of the invention are accomplished in a support carriage straddling a generally vertical column and having wheels engaging the column as follows: a wheel at the lower front of the carriage engaging the front of the column; a wheel at the upper rear of the carriage engaging the rear of the column; a bracket pivoted at the lower rear of the carriage; a wheel arranged on the bracket to engage the rear of the column; and a counterbalance spring extending between the bracket and the top of the column for counterbalancing the equipment and pivotally biasing the bracket to urge its wheel against the rear of the column. The counterbalance spring is preferably a flat, coiled strip and preferably both its lifting and coiling force is used to pivot the bracket to force the bias wheel against the rear of the column. Also, the bias wheel preferably engages one rear edge of the column, and a preferably adjustable, fixed wheel supported by the carriage on approximately the same axis as the bias wheel engages the opposite rear edge of the column. An adjusting knob on the lower front wheel is preferred for fine vertical adjustment on the carriage.

In the drawings:

FIG. 2 is a slide elevation of the inventive support carriage and column;

FIG. 3 is a cross section of the structure of FIG. 2 taken along the line 3—3 thereof;

FIG. 4 is a partial cross sectional view of the structure of FIG. 2 taken along the line 4—4 thereof;

FIG. 5 is a partial cross sectional view of the structure of FIG. 2 taken along the line 5—5 thereof;

FIG. 6 is a rear elevation of the inventive support carriage and column;

FIG. 7 is a partial cross sectional view of the structure of FIG. 5 taken along the line 7—7 thereof;

FIG. 8 is a slide elevational view of a counterbalance spring and a bias wheel bracket for the inventive support structure and showing the biasing effect of the spring on the bracket;

FIG. 9 is a partial side elevation of a lower rear corner of the inventive carriage, showing location means for adjusting the axis position of the location wheel;

FIG. 10 is a partial rear elevation of an alternative bracket wheel arrangement according to the invention.

Figure 1:
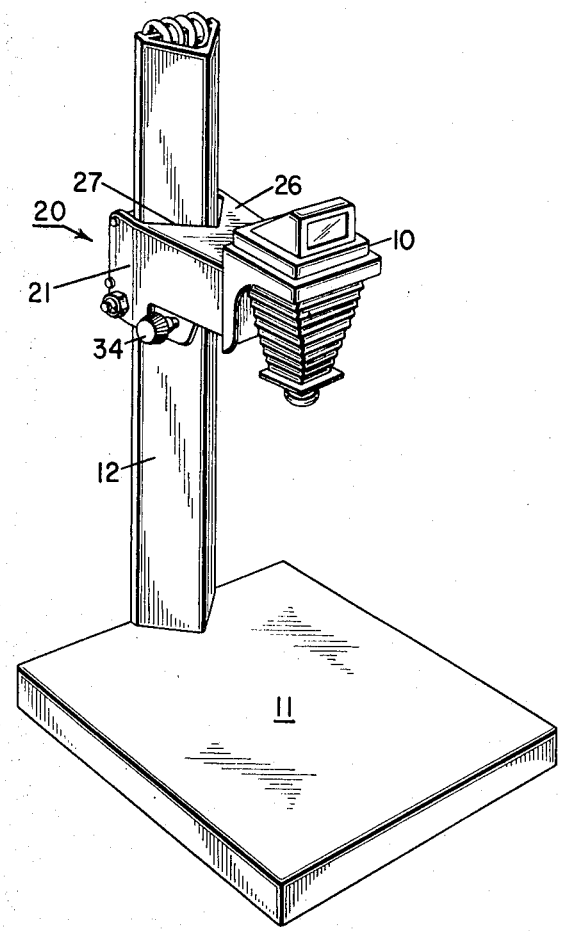
FIG. 1 is a perspective view of the inventive support structure arranged to support photographic equipment over a working surface.

The inventive support structure, as shown in the drawing, is embodied in a device for supporting a schematically illustrated copy camera for vertical motion over a copyboard, and throughout the drawings, the same reference numbers have been given to the same parts. The illustrated embodiment is described below, but those skilled in the art will understand that many other embodiments of the invention are possible, other photographic equipment can be mounted on the support structure, and many different arrangements and variations can be made within the spirit of the invention.

As best shown in FIG. 1, camera 10 is mounted for vertical motion over copyboard 11 on column 12. Column 12 is secured to one edge of copyboard 11 and extends generally vertically above copyboard 11.

Column 12 is preferably an extrusion of a material such as aluminum, and its cross sectional shape is generally triangular as best shown in FIG. 3, with apex 13 facing forward toward copyboard 11 and front walls 14 and 15 extending from apex 13. Column 12 is preferably hollow and has a rear wall 16 extending between walls 14 and 15. A pair of ridges 17 and 18 extend rearwardly from column 12 at its opposite rear edges, and a pair of internal strengthening ridges 19 are formed to strengthen the rear wall 16.

Support carriage 20 includes a metal casting 21 having sidewalls 22 and 23 extending back to a respective pair of flanges 24 and 25 straddling and extending rearwardly of column 12. Casting 21 has an upper wall 26 that is formed with a generally triangular recess 27 to receive column 12. A front wall 28 of casting 21 supports camera 10 in a generally known way. At the lower front of carriage 20, casting walls 29 and 30 extend inward in front of walls 14 and 15 of column 12.

Carriage 20 is supported for movement on column 12 by wheels and axles. A first axle 31 extending between casting walls 29 and 30 supports a front wheel 32 having a groove 33 for engaging the apex 13 of column 12. The groove 33 of wheel 32 is preferably lined with high coefficient of friction material such as rubber or a plastic material for a firm friction engagement with apex 13. A knob 34 is secured to axle 31 for manually turning wheel 32 for fine vertical adjustment of carriage 20 on column 12.

A second axle 35 extends between flanges 24 and 25 at the upper rear of carriage 20 and supports upper rear wheel 36 in free rolling engagement with the rear wall 16 of column 12 preferably in the region of strengthening ridges 19. The overhung weight of carriage 20 and camera 10 on column 12 is generally supported by wheels 36 and 32.

A third axle 37 extends between flanges 24 and 25 at the lower rear of carriage 20 behind column 12 and pivotally supports a bracket 38. Bracket 38 carries a fourth axle 39 supporting bias wheel 40 which engages ridge 18 at a rear edge of column 12 and which has flanges 41 straddling ridge 18.

A fifth axle 42 at the lower rear of carriage 20 supports location wheel 43 which engages ridge 17 at a rear edge of column 12 and which has flanges 44 straddling ridge 17 for accurate lateral positioning. Axle 42 is in approximate alignment with axle 39 so that wheels 40 and 43 are approximately coaxial during movement of carriage 20. Wheel 43 is preferably mounted on axle 42 so as to be adjustable toward and away from ridge 17.

Such adjustment is preferably accomplished by an eccentric mounting best shown in FIG. 9. A threaded plug 55 is screwed into flange 24 of casting 21 and slot 56 is used for turning plug 55 to the desired position relative to flange 24. Plug 55 has an eccentric hole for housing axle 42, and a lock nut 57 is turned onto plug 55 and tightened against the outer wall of flange 24 to hold plug 55 firmly against turning from its set position. By setting plug 55 in different angular positions, axle 42 is moved closer or further away from ridge 17 as desired for lateral adjustment of photographic equipment. Other means for adjusting the lateral position of axis 42 relative to ridge 17 are also possible within the spirit of the invention.

A pair of counterbalance springs 45 and 46 extend between bracket 38 and the top of column 12. Springs 45 and 46 are preferably flat strips that normally form respective coils 47 and 48 rotatably mounted at the top of column 12. Flanges 49 guide spring strips 45 and 46 onto coils 47 and 48 and flanges 49 extend rearwardly through slots 50 formed in the upper end of rear wall 16. The lower ends of coil springs 45 and 46 have respective hooks 51 and 52 hooked over the lower forward edge 53 of bracket 38. Springs 45 and 46 exert an upward lifting force on bracket 38 to counterbalance carriage 20 and camera 10.

Several forces effect the motion and positioning of carriage 20. The overhanging weight of carriage 20 and camera 10 exert a downward force on the front of carriage 20 to force wheel 32 into engagement with apex 13 and wheel 36 into engagement with rear wall 16. At the lower rear of carriage 20 stabilization and accurate positioning is accomplished by location wheel 43 and bias wheel 40. Wheel 43 is preferably laterally adjustable to accurately fix the position of the lower right corner of carriage 20 relative to column 12 as viewed in FIG. 6. Wheel 40 which is pivoted with bracket 38, is biased against ridge 18 at the lower left corner of carriage 20 as viewed in FIG. 6 to draw friction wheel 32 into firm and accurate engagement with apex 13, and to keep the entire carriage firmly entrained against column 12 and accurately positioned relatively to location wheel 43.

The biasing of wheel 40 is accomplished by counterbalance springs 45 and 46 acting on bracket 38. Bracket 38 is freely pivotal, and the lifting force of springs 45 and 46 applied to the lower forward edge of bracket 38 pivots axle 39 toward the rear of column 12 because of the lever arm of the force of springs 45 and 46 relative to bracket pivot axle 37. Thus the lifting force of springs 45 and 46 not only counterbalances carriage 20 and camera 10, but biases wheel 40 into engagement with column 12.

The resiliently assumed coil position of springs 45 and 46 tends to turn hooks 51 and 52 inward toward the rear of column 12 and to bow springs 45 and 46 outward rearwardly away from column 12 between coils 47 and 48 and hooks 51 and 52. Such coiling force as illustrated in FIG. 8 is used to turn the lower edge of bracket 38 inward toward the rear of column 12. Since hooks 51 and 52 firmly engage the lower edge 53 of bracket 38 and since lengths of springs 45 and 46 adjacent hooks 51 and 52 bear against front face 54 of bracket 38, the coiling force of springs 45 and 46 exerts a strong clockwise pivotal bias on bracket 38 as shown in FIG. 8. This further increases the force urging wheel 40 against ridge 18 and increases the stability and security of the biasing and location of carriage 20 relative to column 12. Thus, the lateral stability of carriage 20 is increased by utilizing both the lifting and curling forces of springs 45 and 46 in addition to the overhanging weight of carriage 20 and camera 10.

In an alternative embodiment, two bias wheels can be arranged on bracket axle 39, as illustrated in FIG. 10. A pair of wheels 58 and 59 are each secured to axle 39 to engage ridges 18 and 17 respectively. Wheel 58 has flanges 60 straddling ridge 18 and wheel 59 has flanges 61 straddling ridge 17. With such an arrangement both wheels 58 and 59 are biased against the rear of column 12 by counter-balance springs 45 and 46 as previously described. Preferably, wheels 58 and 59 are axially adjustable on axle 39, and for such purpose, wheel 58 has a collar 62 housing a set screw 63, and wheel 59 has a collar 64 housing a set screw 65 so that wheels 58 and 59 can be slid to a desired position on axle 39 and set in place. Such axial positioning fixes the lateral location of equipment mounted on the front of casting 21.

In operation, carriage 20 and camera 10 can be raised and lowered rapidly on column 12, and the wheels of carriage 20 engage column 12 smoothly and with controlled stability so that such rapid vertical motions are smooth, easy, and appropriately counterbalanced. Also, fine vertical positioning through manual adjustment of knob 34 is smooth and accurate and lateral positioning of camera 10 is assured at all times with the inventive wheel and bias arrangement.

Many alternatives and other embodiments of the inventive support are possible. For example, a pair of spaced apart wheels can be substituted for wheel 36 tracking on the center of rear wall 16. One counterbalance spring can be used instead of the two springs illustrated, or more than two springs can be used. Different types of springs can be used, and springs can be mounted on carriage 20 as well as on the top of column 12. Also, axle 39 can be arranged above bracket axle 37, and the bias wheel brackets can be pivoted in the opposite direction by counter balance springs extending from its lower rear edge. With such an arrangement, the counterbalance springs are preferably arranged to coil in the opposite direction so that coiling as well as lifting bias is applied to the bias wheel bracket. The vertical support column can be set at any desired angle to the work surface, and can be formed with other than a triangular cross section. Additional wheels can be added for any desired purpose such as automatic focusing. A position locking device can be included to clamp to any convenient portion of column 12 such as to ridges 17 and 18 to secure carriage 20 in position. Other embodiments and variations are also possible within the spirit of the invention.

It will thus be seen that the invention accomplishes all its above-stated objects. Other features, advantages, and other specific embodiments of this invention will be apparent to those exercising ordinary skill in the pertinent art after considering the foregoing disclosure. In this regard, while a specific preferred embodiment has been described in detail, such disclosure is intended as illustrative, rather than limiting, and other embodiments, variations, and modifications can be effected within the spirit and the scope of the invention as disclosed and claimed. Furthermore, the following claimed subject matter is intended to cover fully all the aspects of the disclosed invention that are unobvious over prior art, including all equivalent embodiments.

I claim:

1. In a photographic apparatus support structure including a generally vertical column, a carriage straddling said column for vertical motion thereon, and means for securing said photographic apparatus to the front of said carriage, the improvement comprising:
   (a) a front wheel mounted on a first axis transverse to said column and disposed at the lower front of said carriage, said front wheel engaging the front of said column;
   (b) an upper rear wheel mounted on a second axis transverse to said column and disposed at the upper rear of said carriage, said upper rear wheel engaging the rear of said column;
   (c) a bracket pivotally mounted on a third axis transverse to said column at the lower rear of said carriage;
   (d) a bias wheel mounted on a fourth axis transverse to said column and arranged on said bracket, said bias wheel engaging the rear of said column; and
   (e) a counterbalance spring extending between said bracket and the top region of said column for counterbalancing said photographic apparatus and pivotally biasing said bracket to urge said bias wheel against the rear of said column.

2. The support structure of claim 1 wherein said fourth axis is below and forward of said third axis.

3. The support structure of claim 2 wherein said counterbalance spring comprises a coiled spring strip mounted at the top of said column and secured to the lower forward edge of said bracket.

4. The support structure of claim 3 wherein said spring strip is biased to curl its lower end inward toward the back of said column and is arranged to bear against a forward face of said bracket so that said coiling bias urges said bias wheel against said rear of said column.

5. The support structure of claim 1 including a location wheel mounted on said carriage for engaging the rear of said column in a track laterally spaced from the track of said bias wheel and approximately at the level of said bias wheel.

6. The support structure of claim 5 including means for adjusting the axis position of said location wheel.

7. The support structure of claim 1 wherein said column is generally triangular in cross section with the apex of said triangle extending forward of said column.

8. The support structure of claim 7 wherein a pair of ridges extend rearwardly from said column along respective opposite rear edges of said column.

9. The support structure of claim 8 wherein said bias wheel has flanges straddling one of said ridges and including a location wheel mounted on said carriage and having flanges straddling the other one of said ridges approximately at the level of said bias wheel.

10. The support structure of claim 9 including means for adjusting the axis position of said location wheel.

11. The support structure of claim 1 wherein a pair of wheels are mounted on said fourth axis of engaging the rear of said column in laterally spaced tracks.

12. The support structure of claim 11 wherein said column is generally triangular in cross section with the apex of said triangle extending forward of said column and having a pair of ridges extending rearwardly of said column along respective opposite rear edges of said column, and wherein said pair of wheels on said fourth axis each have flanges straddling a respective one of said ridges.

13. The support structure of claim 12 including means for axially adjusting said pair of wheels on said fourth axis.

14. The support structure of claim 1 wherein said front wheel is provided with high coefficient of friction material for engaging the front of said column.

15. The support structure of claim 1 including a knob for turning said front wheel to adjust the elevation of said carriage.

16. The support structure of claim 1 wherein said counterbalance spring comprises a coiled spring strip mounted at the top of said column and secured to said bracket.

17. In a photographic apparatus support structure including a generally vertical column having a front surface and a rear surface, and a carriage adjustably connected to said column for vertical movement thereon and adapted to carry photographic apparatus thereon, the improvement comprising:
   (a) a lower front wheel mounted on a first axis connected to said carriage, said first axle being transverse to said column, and said lower front wheel being disposed at a lower front portion of said carriage and engaging said front surface of said column;
   (b) an upper rear wheel mounted on a second axle connected to said carriage, said second axle being transverse to said column, and said upper rear wheel being disposed at an upper rear portion of said carriage and engaging said rear surface of said column;
   (c) a spring connected between said carriage and said column for exerting an upward force on said carriage; and
   (d) lateral stabilizing means pivotally mounted on said carriage and engaging said column at a surface location thereof laterally spaced from the location on said column engaged by said upper rear wheel, said lateral stabilizing means also being connected to said spring and being urged into engagement with said column by said spring, for laterally stabilizing said carriage on said column.

18. The support structure of claim 17 wherein said lateral stabilizing means includes:
   (e) a bracket pivotally mounted on a third axle connected to said carriage, said third axle being transverse to said column; and
   (f) a bias wheel mounted on a fourth axle connected to said bracket, said fourth axle being transverse to said column, said bias wheel being urged into engagement with said rear surface of said column in response to the force exerted on said bracket by said spring.

19. The support structure of claim 18 wherein said spring is a counterbalance spring comprising a coil spring strip mounted on top of said column and connected at a lower end of said spring to a lower forward edge of said bracket.

20. The support structure of claim 19 including a location wheel rotatably mounted on said carriage and engaging said rear surface of said column at a location thereon laterally spaced from the location engaged by said upper rear wheel and on the opposite side of said upper rear wheel from said bias wheel.

21. In a photographic apparatus support structure including a generally vertical column, a carriage adapted to hold a photographic apparatus and being vertically movably mounted on said column and a counterbalance spring connected between said carriage and said column for exerting an upward force on said carriage, the improvement comprising:

lateral stabilizing means movably mounted on said carriage and also connected to said spring for movement into engagement with said column in response to a force exerted on said lateral stabilizing means by said spring, for laterally stabilizing said carriage on said column.

22. The support structure according to claim 21 including means for vertically movably mounting said carriage on said column and wherein said lateral stabilizing means comprises:

bias means pivotally mounted on said carriage and urged into engagement with said column by said spring at a location on said column laterally spaced from the location on said column engaged by said vertically movably mounting means.

References Cited
UNITED STATES PATENTS 3,270,652  9/1966  Mason et al. _____ 355—63 X NORTON ANSHER, Primary Examiner R. A. WINTERCORN, Assistant Examiner U.S. Cl. X.R.

95—86; 355—63

UNITED STATES PATENT OFFICE
CERTIFICATE OF CORRECTION

Patent No. 3,531,197              Dated September 29, 1970

Inventor(s) Charles R. King

It is certified that error appears in the above-identified patent and that said Letters Patent are hereby corrected as shown below:

Claim 17
    (a) line 1, "axis" should read --axle--

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents